United States Patent
Kataoka et al.

[11] Patent Number: 5,976,430
[45] Date of Patent: Nov. 2, 1999

[54] METHOD FOR SEPARATING AND REMOVING COVERS FROM GOLF BALLS AND FOR RECYCLING GOLF BALLS

[75] Inventors: Nobuyuki Kataoka; Yoshihiko Fujii, both of Saitama, Japan

[73] Assignee: Bridgestone Sports Co., Ltd., Tokyo, Japan

[21] Appl. No.: 08/886,407

[22] Filed: Jul. 1, 1997

[30] Foreign Application Priority Data

| Jul. 1, 1996 | [JP] | Japan | 8-190097 |
| Sep. 10, 1996 | [JP] | Japan | 8-261284 |
| Jun. 10, 1997 | [JP] | Japan | 9-151953 |

[51] Int. Cl.$^6$ .................................................. B29C 67/00
[52] U.S. Cl. .................... 264/36.12; 29/403.4; 29/426.4; 225/3; 225/100; 264/139; 264/279.1; 264/911
[58] Field of Search ..................... 264/138, 139, 264/279.1, 911, 36.12; 156/98, 344, 584; 225/100, 3; 29/403.3, 403.4, 426.4

[56] References Cited

U.S. PATENT DOCUMENTS

| 3,268,634 | 8/1966 | Glaser | 264/36 |
| 4,894,958 | 1/1990 | Takasaki | 51/289 |
| 5,389,169 | 2/1995 | McRae | 156/98 |
| 5,390,932 | 2/1995 | Russo, Sr. | 273/220 |
| 5,427,377 | 6/1995 | Maruoka | 273/230 |
| 5,609,535 | 3/1997 | Morgan | 473/409 |

*Primary Examiner*—Jan H. Silbaugh
*Assistant Examiner*—Edmund H. Lee
*Attorney, Agent, or Firm*—Sughrue, Mion, Zinn, Macpeak & Seas, PLLC

[57] ABSTRACT

There are disclosed a method and an apparatus for removing a cover from a golf ball. There is used a pair of geared rolls in an engaged manner, each geared roll comprising a cylindrical shaft on which teeth are axially formed and are circumferentially arranged at predetermined pitches. After the pair of geared rolls are rotated, the golf ball is placed on the upstream side of rotation of the geared rolls, so that part of the cover of the golf ball is bitten between the geared rolls. The cover bitten between the geared rolls is advanced by a rotational force of the geared rolls and is drawn out to the downstream side of rotation of the geared rolls. In this way, the core and cover of the golf ball are separated from each other. Accordingly, the cover can be mechanically removed from the golf ball with improved efficiency, so that the efficiency of work for recycling golf balls can be improved, and the amount of golf balls disposed as industrial waste can be reduced.

9 Claims, 8 Drawing Sheets

METHOD FOR SEPARATING AND REMOVING COVERS FROM GOLF BALLS AND FOR RECYCLING GOLF BALLS

BACKGROUND OF THE INVENTION

1. Field of the Invention

The present invention relates to a method for removing covers from golf balls and to a method of recycling golf balls through the use of cores or covers separated by the above method.

2. Related Art

Conventionally, in order to recycle solid golf balls such as two-piece golf balls, golf balls are heated so as to be softened to some extent, and subsequently covers are manually separated from cores through the use of pliers, nippers, or the like.

Since manual removal of covers from golf balls takes time, the efficiency in removing covers is relatively low. Also, this work is labor intensive. With production of golf balls increasing in recent years, the amount of golf balls disposed of industrial waste is increasing. If golf balls can be efficiently recycled, the disposal of golf balls as industrial waste will decrease considerably.

SUMMARY OF THE INVENTION

The present invention has been made in view of the above circumstances, and an object of the present invention is to provide a method for removing covers from golf balls capable of mechanically and efficiently removing covers from golf balls, thus replacing manual removal of covers, which requires heavy labor and whose efficiency is low, and contributing to an improvement in efficiency of recycling golf balls as well as to a reduction in the disposal of golf balls as industrial waste.

Another object of the present invention is to provide a method of recycling golf balls capable of efficiently recycling golf balls through the use of cores and covers separated by the above-mentioned method and an apparatus for removing covers from golf balls, thus contributing to a reduction in the disposal of golf balls as industrial waste.

To achieve the above objects, the present invention provides a method of removing covers from golf balls (first aspect of the invention), an apparatus for removing covers from golf balls (second aspect of the invention), and a method of recycling golf balls (third and fourth aspects of the invention).

Method of Removing Covers from Golf Balls

First aspect of the invention: A method of removing a cover from a golf ball, comprising the steps of: rotating a pair of geared rolls in an engaged manner, each geared roll comprising a cylindrical shaft on which teeth are axially formed and are circumferentially arranged at predetermined pitches; placing the golf ball on the upstream side of rotation of the geared rolls in order to cause part of the cover of the golf ball to be bitten between the geared rolls; and advancing the cover bitten between the geared rolls by a rotational force of the geared rolls and thereby drawing the cover out to the downstream side of rotation of the geared rolls, to thereby separate the core and the cover of the golf ball from each other.

Apparatus for Removing Covers from Golf Balls

Second aspect of the invention: An apparatus for removing a cover from a golf ball, comprising cover separation means which comprises a pair of geared rolls, which rotate in an engaged manner and each of which comprises a cylindrical shaft on which teeth are axially formed and are circumferentially arranged at predetermined pitches, wherein part of the cover of the golf ball, which is placed on the upstream side of rotation of the geared rolls, is bitten between the geared rolls, and the cover bitten between the geared rolls is advanced by a rotational force of the geared rolls to be drawn out to the downstream side of rotation of the geared rolls, to thereby separate a core and the cover of the golf ball from each other.

Methods of Recycling Golf Balls

Third aspect of the invention: A method of recycling a golf ball, comprising the steps of separating a core and a cover of a golf ball from each other by the method or apparatus for removing covers from golf balls according to the present invention, and enclosing the obtained core with a cover.

Fourth aspect of the invention: A method of recycling a golf ball, comprising the steps of separating a core and a cover of a golf ball from each other by the method or apparatus for removing covers from golf balls according to the present invention, and enclosing a core with a cover material made from the obtained cover.

According to the present invention, the above-described pair of geared rolls are rotated in an engaged manner, and a golf ball is placed on the upstream side of rotation of the geared rolls to thereby bite part of the cover thereof between the geared rolls. As a result, the part of the cover is pulled to be separated from the core of the golf ball. Further, the cover bitten between the geared rolls is advanced by a rotational force of the geared rolls to be drawn out to the downstream side of rotation of the geared rolls. Accordingly, the entire cover is separated from the core, and only the separated cover is ejected to the downstream side of rotation of the geared rolls. On the other hand, the core does not pass between the geared rolls, and thus remains on the upstream side of rotation of the geared rolls. Accordingly, the present invention allows easy separation of a core and a cover of a golf ball from each other.

The method and the apparatus for removing covers from golf balls according to the present invention can mechanically and efficiently remove covers from golf balls, replacing manual removal of covers which requires heavy labor and whose efficiency is low, and can attain increased capability of separation of cores from covers, reduced work load, and full automation, thus contributing to efficient recycling of golf balls and to a reduction of the disposal of golf balls as industrial waste. Also, the method of recycling golf balls according to the present invention can efficiently recycle golf balls, thus contributing to a reduction in the disposal of golf balls as industrial waste.

DESCRIPTION OF THE INVENTION AND PREFERRED EMBODIMENTS

The present invention will now be described in detail. In the present invention, golf balls whose covers are to be removed are multipiece solid golf balls such as two-piece golf balls and three-piece golf balls, each golf ball comprising a core and a cover for enclosing the core. Also, in the present invention, a material for a cover to be removed is preferably a thermoplastic resin, particularly preferably an ionomer resin.

Figure 1:
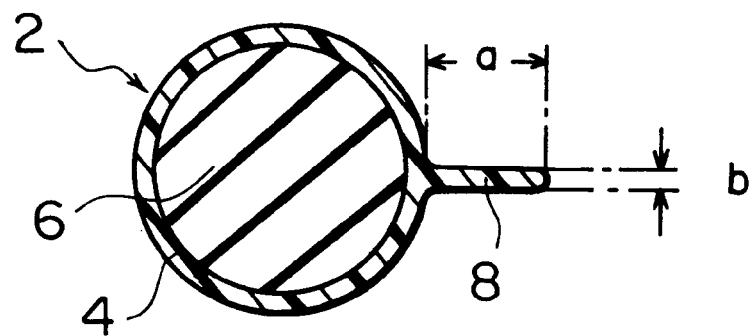
FIG. 1 is a schematic view showing a golf ball whose cover is partially deformed into a projection.

In the present invention, when part of the cover of a golf ball is to be bitten between geared rolls, a golf ball may be placed intact on the upstream side of rotation of the geared rolls. However, a golf ball is preferably heated prior to a cover-removing step, and then, as shown in FIG. 1, a cover 4 of a heated golf ball 2 is partially deformed to form a projection 8, followed by the biting of the projection 8 between the geared rolls. This allows smooth removal of the cover 4. In FIG. 1, numeral 6 denotes a core.

In view of easy formation of the projection 8, the cover 2 is heated preferably to a temperature which is 30 to 60° C. higher than a softening point (a Vicat softening point) thereof, particularly preferably 40 to 50° C. higher than the softening point. For example, the cover 2 made of an ionomer resin is preferably heated to a temperature of approximately 90 to 140° C.

The dimensions and shape of the projection 8 are not particularly limited but may be such that the projection 8 can be bitten between the geared rolls when the golf ball 2 is placed on the upstream side of rotation of the geared rolls. Preferably, the projection 8 has length a of approximately 10 to 20 mm projecting from the surface of the golf ball 2 and thickness b of approximately 0.3 to 3 mm.

The heating of the golf ball 2 and the formation of the projection 8 may be performed concurrently. For example, as will be described later, the golf ball 2 may be hot-pressed through the use of hot press dies serving also as projection-forming dies to thereby heat the golf ball 2 as well as form the projection 8.

Also, in the present invention, a coating layer may be removed from the surface of a cover before the cover is removed from a golf ball. As a result, the removed cover is composed solely of a material resin thereof to thereby facilitate recycling. In this case, coating-removing means for removing a coating layer is not particularly limited but may comprise a drum, which is rotated after being loaded with golf balls and abrasive, such as sand, to thereby polish the surfaces of the golf balls.

Figure 2:
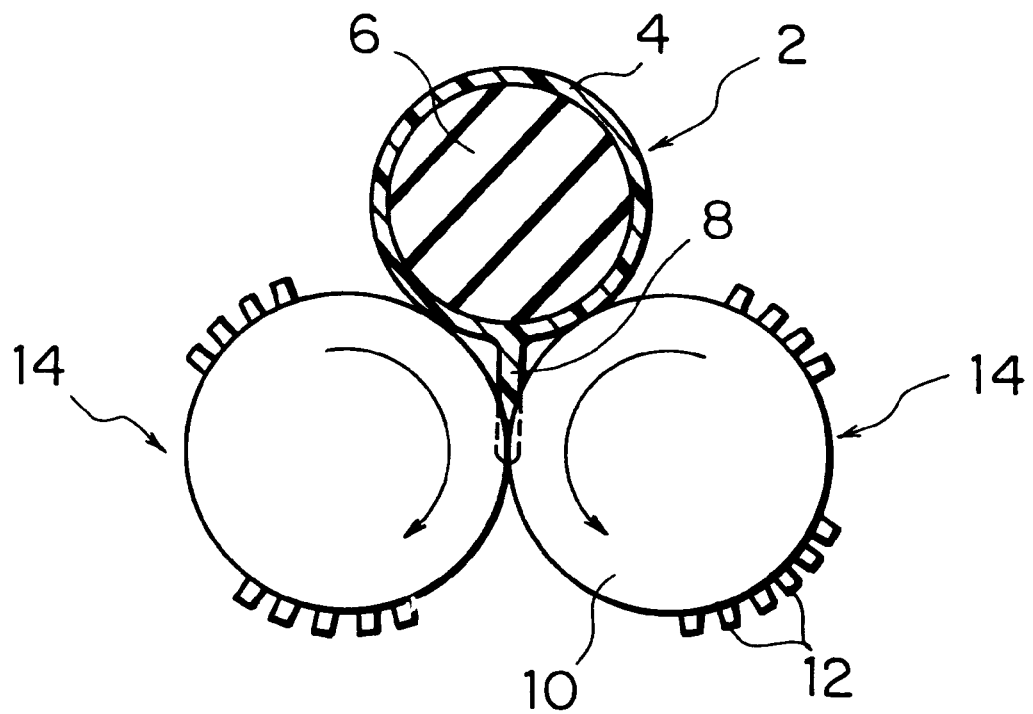
FIG. 2 is a schematic view showing a pair of geared rolls and a golf ball which is placed on the geared rolls on the upstream side of rotation thereof while a projection of a cover is bit between the geared rolls.
Figure 3:
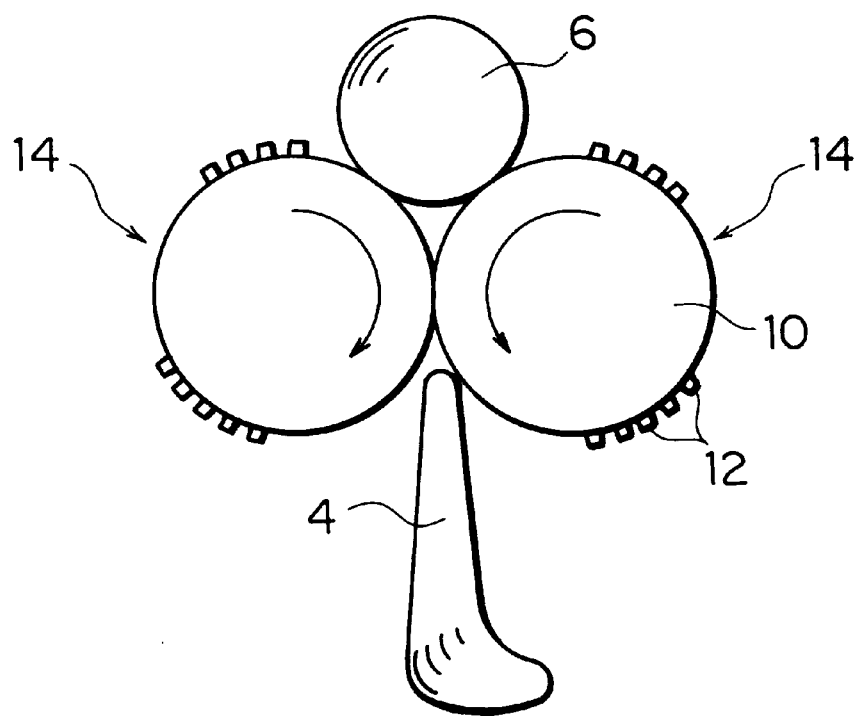
FIG. 3 is a schematic view showing a state after the cover of a golf ball is separated from the core and drawn out to the downstream side of rotation of geared rolls.

In the present invention, after undergoing pretreatments such as the formation of the projection 8 and the removal of a coating layer as needed, the golf ball 2 is subjected to the removal of the cover 4 as shown in FIG. 2. In FIG. 2, each geared roll 14 comprises a cylindrical shaft 10 on which teeth 12 are axially formed and are circumferentially arranged at predetermined pitches, and a pair of the geared rolls 14 rotate in an engaged manner. The golf ball 2 is placed on the upstream side of rotation of the geared rolls 14 so that the part of the cover 4 (projection 8) is bitten between the geared rolls 14. The cover 4 bitten between the geared rolls 14 is advanced by a rotational force of the geared rolls 14 to be drawn out to the downstream side of rotation of the geared rolls 14, to thereby separate a core 6 and the cover 4 from each other as shown in FIG. 3. In FIG. 2 and 3, the teeth 12 are partially omitted.

Before a cover is removed from a golf ball by geared rolls as described above, the cover is heated preferably to a temperature which is 5 to 60° C. higher than a softening point (a Vicat softening point) thereof, particularly preferably 20 to 40° C. higher than the softening point. For example, when the cover is made of an ionomer resin, the cover is heated preferably to a temperature of 90 to 100° C. By softening the cover to some extent before it is subjected to removal by the geared rolls, the speed of removing the cover can be increased.

When the above-mentioned projection is formed on the cover before it is subjected to removal by the geared rolls, the cover does not need to be reheated before entering the cover-removing step if time interval between a projection-forming step and a cover-removing step is relatively short so that the cover enters the cover-removing step while maintaining a sufficiently high temperature. However, when the temperature of the cover drops too low before the cover enters the cover-removing step due to a long time interval between the projection-forming step and the cover-removing step, the cover is preferably reheated before entering the cover-removing step.

A pair of geared rolls used in the present invention may be of the same diameter or of different diameters. Preferably, a pair of geared rolls having the same diameter are disposed in parallel and sideways and are rotated inwardly as viewed from above. As a result of employment of this arrangement, when a golf ball is placed on the geared rolls, only the cover thereof can be drawn out under the geared rolls. Thus, this arrangement simplifies the apparatus structure and the cover-removing operation.

When a pair of geared rolls having the same diameter are disposed in parallel and sideways, in view of the advantage in cover-removing performance, the geared rolls have a diameter of a deddendum circle (a circle passing through the bottoms of the teeth) of preferably 30 to 50 mm, particularly preferably 35 to 45 mm, a diameter of an addendum circle (a circle passing through the tips of the teeth) of preferably 40 to 60 mm, particularly preferably 45 to 55 mm, and a circular pitch (the length of a pitch circle divided by the number of teeth) of 5 to 7 mm. Further, the geared rolls preferably have an axial length of approximately 50 to 200 mm and a rotational speed of approximately 20 to 60 rpm.

When a pair of geared rolls having the same diameter are disposed in parallel and sideways, the respective center axes of the geared rolls are preferably inclined. This allows a core separated from a cover to roll down the geared rolls to be ejected therefrom, thereby facilitating collection of cores.

The shape of the tip of a tooth of geared rolls used in the present invention is not particularly limited but may be flattened, pointed, rounded, or the like. Also, the tip of a tooth of the geared rolls may be flat in an axial direction or have a series of ridges and grooves in an axial direction for better bite of a cover between the geared rolls.

Figure 4:
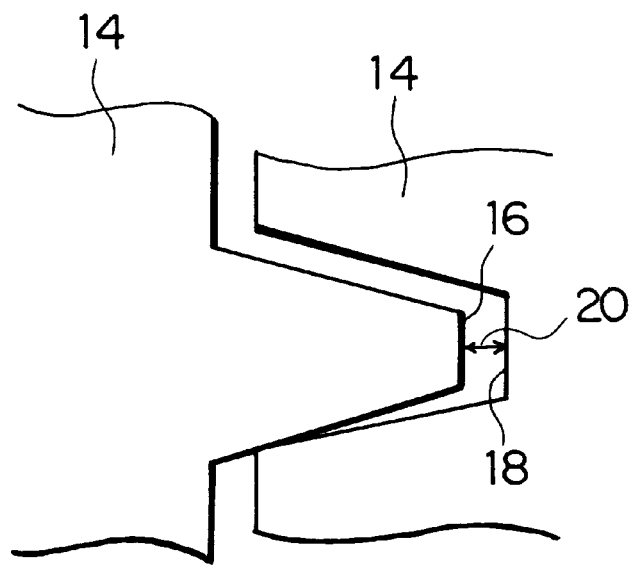
FIG. 4 is a view showing a gap formed between the tooth crest of one geared roll and the bottom land of the other geared roll.

A pair of geared rolls used in the present invention are preferably structured such that, as shown in FIG. 4, a gap 20 is formed between the tooth crest 16 of one geared roll 14 and the bottom land 18 of the other geared roll 14. Through the use of the geared rolls having such a structure, part of the cover, particularly the aforementioned projection extending from the cover and having a certain thickness, can be easily bitten between the geared rolls. Preferably, the width of the gap 20 is approximately 1 to 3 mm, as illustrated in FIG. 4.

In an apparatus for removing covers from golf balls according to the present invention comprising cover separation means which, in turn, comprises a pair of geared rolls having the same diameter, the apparatus is preferably equipped with pressing means for pressing a golf ball, which is placed on and between both geared rolls, against one of the two geared rolls. In the initial stage of a cover-removing operation, this pressing means presses a golf ball against one of the two geared rolls to thereby effectively prevent a problem that the golf ball would otherwise slide in a depression defined by the geared rolls without the cover being bitten between the geared rolls.

Also, the apparatus for removing covers according to the present invention is preferably equipped with heating means for heating a golf ball and projection-forming means for deforming part of the cover of a heated golf ball into a projection in addition to the cover separation means comprising a pair of geared rolls. As a result, prior to the step of removing the cover, a golf ball is heated, and part of the cover of the heated golf ball is deformed into a projection, thereby facilitating the step of biting the cover between the geared rolls through capture of the projection between the geared rolls.

In this case, examples of a constituent apparatus for the above-mentioned heating means include a heating die (described later) and a heating furnace. Also, examples of a constituent apparatus for the above-mentioned projection-forming means include hot press dies, which will be described later in the description of an embodiment, and an apparatus which grips part of a cover to form a projection. The hot press dies comprise an upper die and a lower die, each die having a semispheric cavity having a diameter slightly smaller than that of a golf ball. A golf ball is hot-pressed through the use of the dies so as to form an annular projection from a cover along the equator thereof. Also, pliers or the like may be used to grip a cover to thereby form a projection.

The heating means and the projection-forming means may be constructed as separate apparatuses or a single apparatus. Examples of the latter include hot press dies serving also as projection-forming dies which are used to hot-press a golf ball in order to heat a golf ball as well as to form a projection, as will be described later in the description of an embodiment.

Also, the apparatus for removing covers from golf balls according to the present invention is preferably equipped with cover-detaching means for detaching a cover adhering to a geared roll in addition to the cover separation means comprising a pair of geared rolls. When a heated cover is removed from a golf ball by the cover separation means, part of the removed softened cover may adhere to the surface of a geared roll and be caught in a tooth space. When the thus-adhering removed cover is cooled to be hardened and is bitten between the geared rolls, the hardened cover functions to expand the distance between the respective axes of the geared rolls, causing a mechanical problem (e.g. breakage of a shaft bearing of a geared roll). The cover-detaching means, if provided, will prevent the occurrence of such a problem.

The structure of the cover-detaching means is not particularly limited. Two examples of the structure will be described. According to a first exemplified structure, the cover-detaching means comprises a rotary brush which, in turn, comprises a rotary member and linear elements implanted in the rotary member. The rotary brush rotates in the same direction as the rotational direction of a corresponding geared roll while the linear elements are in contact with the geared roll, so that the linear elements detach a cover from the geared roll. In this case, the rotational speed of the rotary brush is usually made faster than that of the geared roll.

The linear elements of the above-described rotary brush may be made of plastics such as nylon, metal, etc. The hardness of the linear elements may be such that the rotary brush can rotate while the linear elements are in contact with a geared roll. The hardness of the linear elements is determined primarily by a material for and the diameter of a linear element. For example, when the linear elements are made of nylon, the diameter thereof is preferably 0.2mm or less. If the linear elements are too hard, a greater force is required to rotate the rotary brush. Also, in view of reliable detachment of a cover, the length of the linear elements is such that the tip of a linear element projects approximately 2 to 5 mm more beyond the tip of a tooth of the geared roll in an assembled state. Since a detached cover may adhere to the linear elements, a scraper may be provided, as needed, in order to scrape a cover from the linear elements.

According to a second exemplified structure, the cover-detaching means comprises an elastic plate whose tip contacts a geared roll. As a geared roll rotates, the tip of the elastic plate scrapes a cover from the geared roll. In this case, the elastic plate may be, for example, a metallic plate spring.

The method of recycling golf balls according to the present invention uses separated cores or covers to recycle golf balls. According to the third aspect, a separated core is enclosed with a cover, whereas according to the fourth aspect, a core is enclosed with a cover material prepared from a separated cover. In the third aspect, a separated core may be enclosed with a cover material prepared from a cover separated by the method or apparatus of the present invention or may be enclosed with a newly prepared cover material. In the fourth aspect, a core separated by the method or apparatus of the present invention or a newly prepared core may be enclosed with a cover material prepared from a separated cover.

In the fourth aspect, a cover separated from a core may be recycled in the following manner. When a coating layer is removed from the surface of a cover before the cover is removed, the removed cover is composed solely of a material resin thereof. Thus, the removed cover may be molten and applied onto a core through injection molding or may be injection-molded to a cover material (such as a half cup), which is then applied onto a core through compression molding. By contrast, when a cover is removed without removing a coating layer from the surface thereof, the removed cover contain a material resin thereof and components of the coating. Thus, the removed cover is molten and then filtered to obtain only the material resin. Likewise, the thus-obtained material resin may be applied onto a core through injection molding or may be injection-molded to a cover material for compression molding use.

First Embodiment

Figure 5:
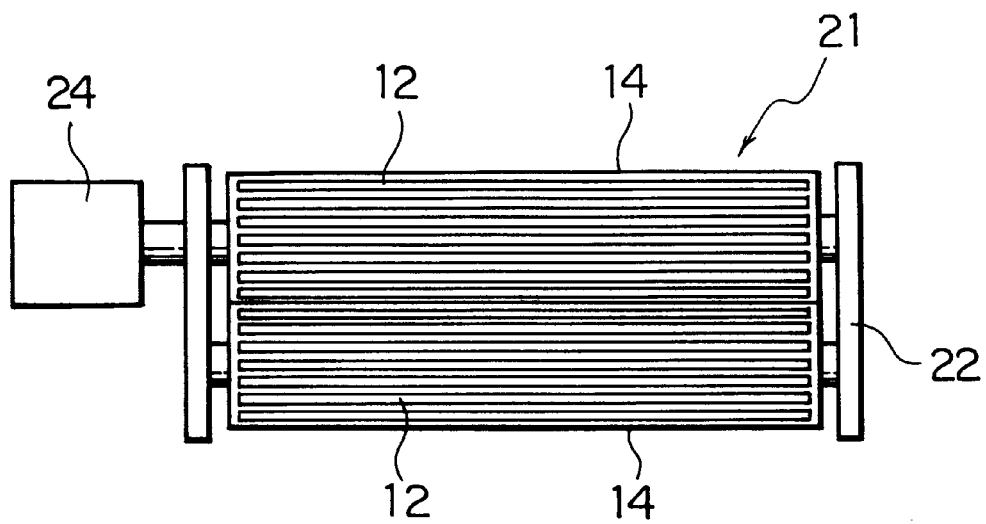
FIG. 5 is a schematic plan view showing an embodiment of an apparatus for removing covers from golf balls according to the present invention.
Figure 6:
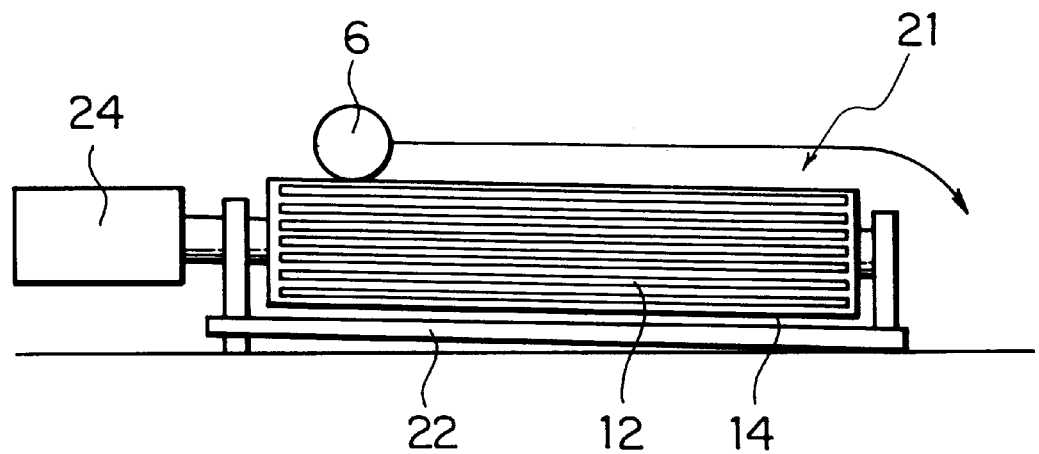
FIG. 6 is a schematic front view of the apparatus of FIG. 5.
Figure 7:
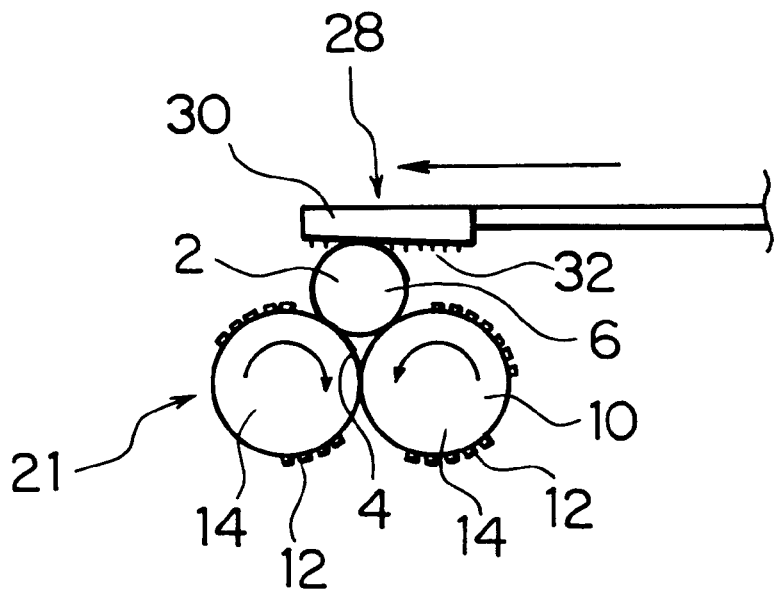
FIG. 7 is a schematic side view of the apparatus of FIG. 5.
Figure 8:
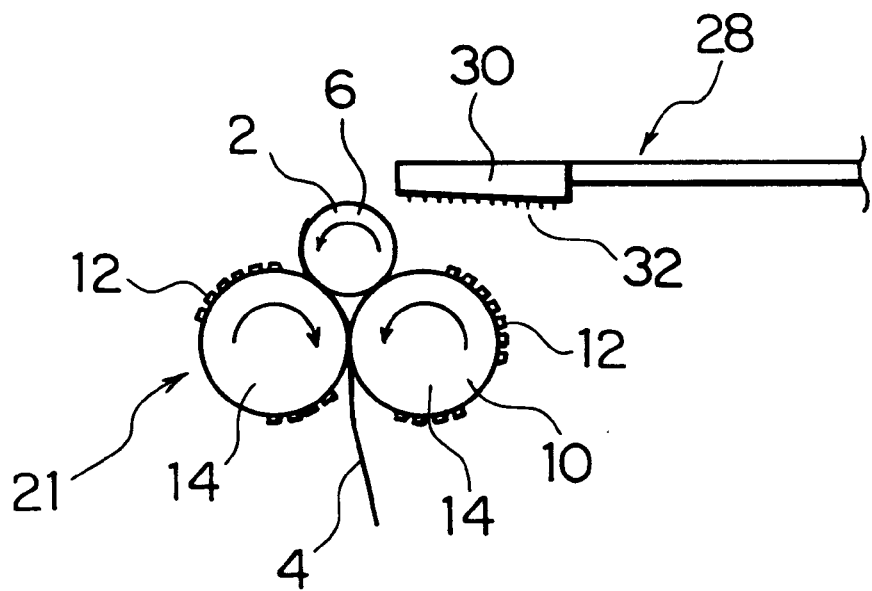
FIG. 8 is a schematic side view of the apparatus of FIG. 5.

The present invention will now be described by way of example. FIGS. 5 to 8 show a first embodiment of an apparatus for removing covers from golf balls according to the present invention, wherein FIG. 5 is a schematic plan view, FIG. 6 is a schematic front view, and FIGS. 7 and 8 are schematic side views.

Figure 9:
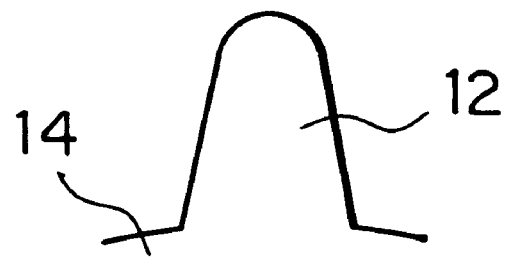
FIG. 9 is a sectional view showing a tooth of a geared roll of the apparatus of FIG. 5 (a sectional view taken perpendicularly to the axis of the geared roll)
Figure 10:
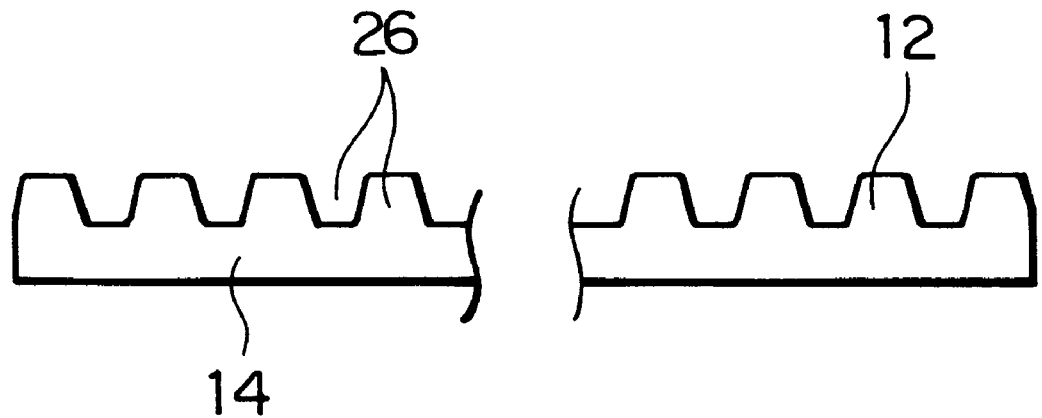
FIG. 10 is an enlarged front view of a tooth of a geared roll of the apparatus of FIG. 5, wherein part of the tooth is omitted.

In FIGS. 5 to 8, numeral 21 denotes cover separation means. In the cover separation means 21, numeral 22 denotes a support frame, and numeral 14 denotes a pair of geared rolls having the same diameter which are arranged in parallel and sideways and rotatably mounted to the support frame 22. Each of the geared rolls 14 comprises a cylindrical shaft 10 on which teeth 12 are axially formed and are circumferentially arranged at predetermined pitches. The geared rolls 14 are engaged and rotated inward as viewed from above (directions indicated by arrows in FIGS. 7 and 8) by a motor 24. The geared rolls 14 are disposed such that their center axes are inclined as shown in FIG. 6. The tip of each tooth 12 of the geared rolls 14 is slightly rounded as shown in FIG. 9. Further, as shown in FIG. 10, ridges and grooves 26 are continuously formed in the tip of each tooth 12 of the geared rolls 14 along an axial direction of each geared roll 14.

In FIGS. 7 and 8, numeral 28 denotes pressing means which is disposed above the geared rolls 14 in a retractable manner in order to press the golf ball 2, which is placed on and between the geared rolls 14, against one geared roll 14. A pressing element 30 of the pressing means 28 is structured such that the bottom surface thereof is inclined downward in the retreating direction thereof and is provided with a number of projections 32. When the pressing means 28 is advanced as shown in FIG. 7, the bottom surface thereof presses the golf ball 2 against one geared roll 14. By contrast, when the pressing means 28 is retreated as shown in FIG. 8, the pressing element 30 moves away from the golf ball 2 to release the golf ball 2.

Through the use of the apparatus for removing covers from golf balls according to the present embodiment, a cover is removed from a golf ball in the following steps:

① The geared rolls 14 of the cover separation means 21 are rotated inward as viewed from above, and the golf ball 2 is placed on the geared rolls 14 (FIG. 7).

② The pressing means 28 is advanced so that the bottom surface of the pressing element 30 presses the golf ball 2 against one geared roll 14. As a result, it is effectively prevented that the golf ball 2 is caught in the depression defined by the geared rolls 14 without the cover 4 being bitten between the geared rolls 14 (FIG. 7).

③ After confirming that part of the cover 4 of the golf ball 2 is bitten between the geared rolls 14 to initiate the removal of the cover 4 from the golf ball 2, the pressing means 28 is retreated to release the golf ball 2 from press by the pressing element 30. Subsequently, while the golf ball 2 is rotating, the cover 4 bitten between the geared rolls 14 is advanced by a rotational force of the geared rolls 14 and is thereby drawn out to the downstream side of rotation of the geared rolls 14. Thus, the core 6 and the cover 4 are separated from each other (FIG. 8).

④ The core 6 remaining on the geared rolls 14 rolls down the inclined geared rolls 14 and then leaves the geared rolls 14 (FIG. 6).

Second Embodiment

Figure 11:
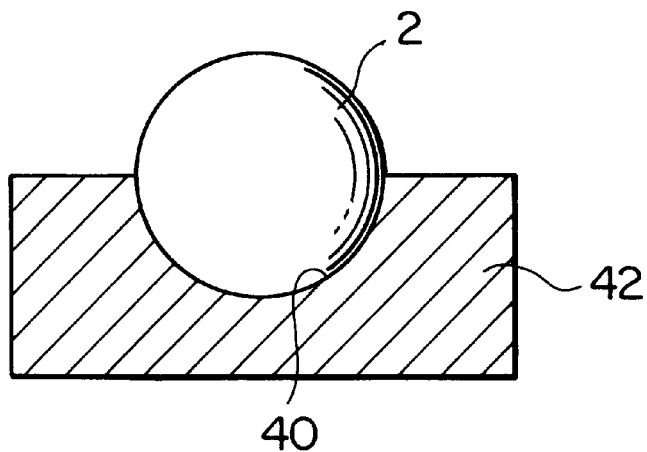
FIG. 11 is a schematic sectional view showing an embodiment of heating means used in an apparatus for removing covers from golf balls according to the present invention.
Figure 12:
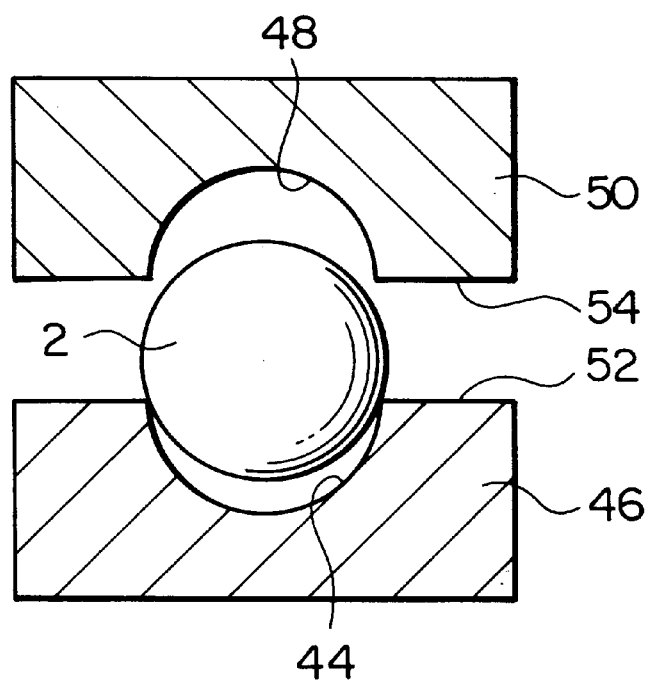
FIG. 12 is a schematic sectional view showing an embodiment of projection-forming means used in an apparatus for removing covers from golf balls according to the present invention.

A second embodiment of an apparatus for removing covers from golf balls according to the present invention comprises cover separation means 21 (not shown) having a structure substantially similar to that shown in FIGS. 5 to 8, heating means as shown in FIG. 11, and projection-forming means as shown in FIG. 12. FIG. 11 shows a schematic sectional view of the heating means, and FIG. 12 shows a schematic sectional view of the projection-forming means. The present embodiment is not equipped with the pressing means 28, which the first embodiment is equipped with.

The heating means of FIG. 11 comprises a heating die 42 having a semispheric cavity 40 having a diameter substantially identical to that of the golf ball 2. The lower half of the golf ball 2 is heated in the cavity 40 of the die 42 to thereby soften the cover of the golf ball 2.

Figure 13:
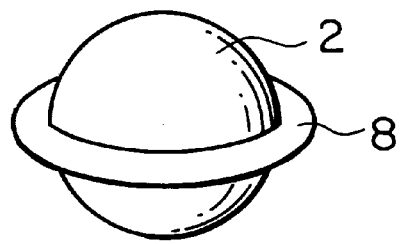
FIG. 13 is a perspective view showing an projection of a cover formed by the projection-forming means of FIG. 12.

The projection-forming means of FIG. 12 comprises a heating lower die 46 having a semispheric cavity 44 having a diameter slightly smaller than that of the golf ball 2 and a heating upper die 50 having a semispheric cavity 48 having the same size as that of the cavity 44. The lower half of the golf ball 2 heated by the heating means is placed in the cavity 44 of the lower die 46. Subsequently, the golf ball 2 is hot-pressed by the dies 46 and 50 so as to partially extrude the softened cover into a space between flat portions 52 and 54. Thus, as shown in FIG. 13, an annular projection 8 is formed along the equator of the golf ball 2. In this case, preferably, the difference between the diameter of the golf ball 2 and that of the cavities 44 and 48 is approximately 1.0 to 2.5 mm.

In the geared rolls 14 used in the present embodiment, a gap of approximately 1.5 mm is formed between a tooth crest and a bottom land, which are opposed each other, as shown in FIG. 4. In the present embodiment, the tip of each tooth 12 of the geared rolls 14 is substantially flat as shown in FIG. 4, but may be rounded as shown in FIG. 9. Further, in the present embodiment, no ridges or grooves are formed in the tip of each tooth 12 of the geared rolls 14. However, as shown in FIG. 10, the ridges and grooves 26 may be continuously formed in the tip of each tooth 12 along an axial direction of each geared roll 14.

Through the use of the apparatus for removing covers from golf balls according to the present embodiment, a cover is removed from a golf ball in the following steps: p1 (1) The cover of a golf ball is softened through application of heat by the heating means shown in FIG. 11.

(2) The annular projection 8 of the cover is formed by the projection-forming means shown in FIG. 12.

(3) The geared rolls of the cover separation means shown in FIGS. 5 to 8 are rotated inward as viewed from above, and a golf ball is placed on the geared rolls so as to make the projection 8 of the cover bitten between the geared rolls (FIG. 2).

(4) The cover bitten between the geared rolls is advanced by a rotational force of the geared rolls and is thereby drawn out to the downstream side of rotation of the geared rolls. Thus, the core and the cover are separated from each other (FIG. 3).

(5) The core remaining on the geared rolls down the inclined geared rolls and then leaves the geared rolls (FIG. 6). The cover and the core are thus collected separately from each other.

In the present embodiment, the projection-forming means of FIG. 12 may be used to concurrently heat a golf ball and form the projection 8, so that the heating means of FIG. 11 becomes unnecessary. In this case, the golf ball is hot-pressed for about one minute by the projection-forming means of FIG. 12 under the conditions of a heating temperature of 130° C. and a load of 1.5 t, to thereby concurrently heat the golf ball and form the projection 8, illustrated in FIG. 13 as an annular ring.

Third Embodiment

Figure 14:
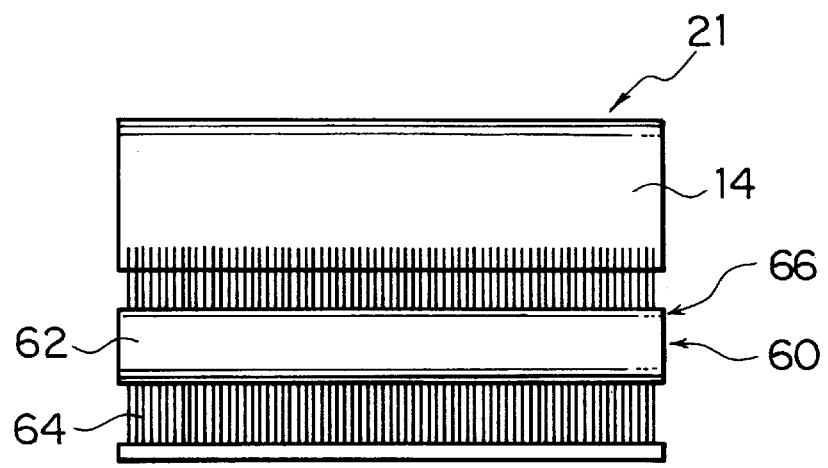
FIG. 14 is a schematic front view showing another embodiment of an apparatus for removing covers from golf balls according to the present invention.
Figure 15:
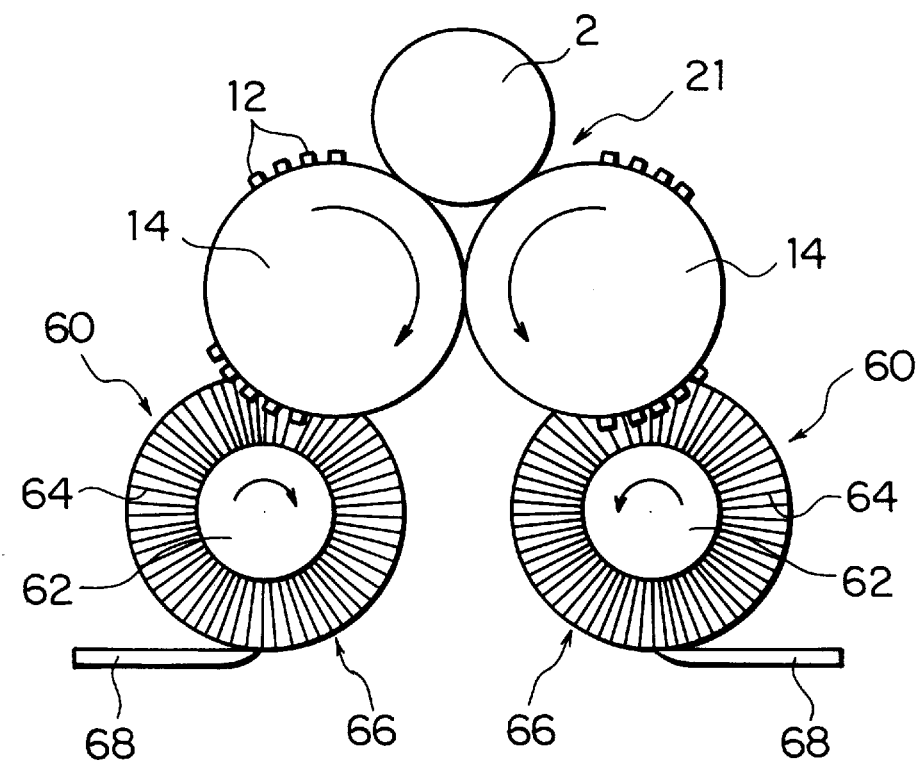
FIG. 15 is a schematic side view showing the apparatus of FIG. 14.

FIGS. 14 and 15 show a third embodiment of an apparatus for removing covers from golf balls according to the present invention. FIG. 14 shows a schematic front view of the apparatus, and FIG. 15 shows a schematic side view of the apparatus. The apparatus of the present embodiment comprises cover separation means 21 similar to that used in the second embodiment and a pair of cover-detaching means 60 for detaching a cover from geared rolls 14 of the cover separation means 21. In FIGS. 14 and 15, a support frame 22 for the cover separation means 21 and the motor 24 are omitted.

Each cover-detaching means 60 comprises a rotary brush 66 which includes a cylindrical rotary member 62 and linear elements 64. The linear elements 64 are densely implanted in the rotary member 62 over the entire circumferential surface thereof. The rotary brush 66 is disposed under the geared roll 14 such that the linear elements 64 are in contact with the geared roll 14 and such that the axis of rotation thereof is in parallel with that of the geared roll 14. A scraper 68 is provided under the rotary brush 66 so as to scrape a cover from the linear elements 64. In FIG. 14, the linear elements 64 are partially omitted.

In each cover-detaching means 60, while the linear elements 64 are in contact with the geared roll 14, the rotary brush 66 rotates in the same direction as does the geared roll 14, to thereby detach a cover, if any, from the geared roll 14. In this case, the rotary speed of the rotary brush 66 is usually rendered smaller than that of the geared roll 14.

Fourth Embodiment

Figure 16:
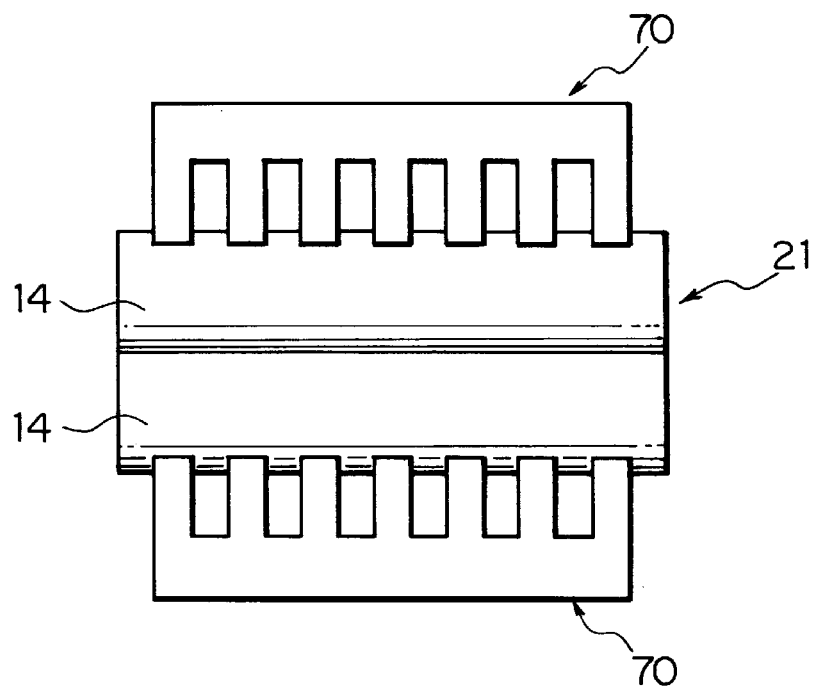
FIG. 16 is a schematic plan view showing a further embodiment of an apparatus for removing covers from golf balls according to the present invention.
Figure 17:
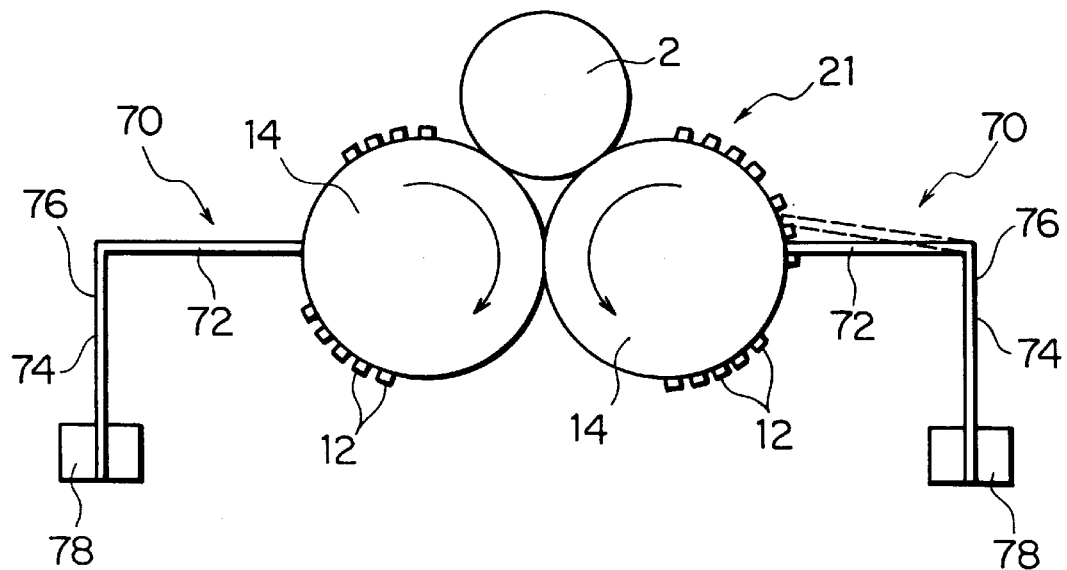
FIG. 17 is a schematic side view showing the apparatus of FIG. 16.

FIGS. 16 and 17 show a fourth embodiment of an apparatus for removing covers from golf balls according to the present invention. FIG. 16 shows a schematic plan view of the apparatus, and FIG. 17 shows a schematic side view of the apparatus. The apparatus of the present embodiment comprises cover separation means 21 similar to that used in the second embodiment and a pair of cover-detaching means 70 for detaching a cover from geared rolls 14 of the cover separation means 21. In FIGS. 16 and 17, a support frame 22 for the cover separation means 21 and the motor 24 are omitted.

Each cover-detaching means 70 comprises a metallic plate spring 76, which has an L-shaped cross section and which includes a comb-like horizontal portion 72 (elastic plate) and a vertical portion 74, and a fixing member 78 for fixing the bottom end section of the vertical portion 74 onto a support frame. The plate spring 76 is disposed such that the tips of the horizontal portion 72 are substantially in contact with the bottom of a tooth of the geared roll 14.

In each cover-detaching means 70, as a result of the geared roll 14 rotating, the tips of the horizontal portion 72 of the plate spring 76 scrape a cover, if any, from the geared roll 14. In this case, the tips of the horizontal portion 72 are pushed up, as represented by the dashed line in FIG. 17, by the tooth 12 of the geared roll 14 as the geared roll 14 rotates. However, as the rotation of the geared roll 14 advances more, the contact of the tips of the horizontal portion 72 with the tooth 12 is canceled. As a result, the horizontal portion 72 is elastically restored to its original horizontal position.

In the above-described third and fourth embodiments, the rotary brush or the elastic plate is in contact with the geared roll along the substantially entire length thereof However, the present invention is not limited thereto. The rotary brush or the elastic plate may be in contact with the geared roll partially along the length thereof so long as a cover can be detached from the geared roll.

EXAMPLES

Example 1

Through the use of the apparatus for removing covers from golf balls according to the first embodiment, covers were removed from golf balls. The geared rolls of the cover separation means used had a diameter of a deddendum circle of 40 mm, a diameter of an addendum circle of 46 mm, a circular pitch of 5.5 mm, and an axial length of 180 mm, and were rotated at a speed of 30 rpm. Golf balls used were two-piece golf balls, each comprising a core made of polybutadiene and a cover made of an ionomer resin (a 50:50 mixture of Himilan 1706 and 1605 manufactured by DuPont-Mitsui Polychemical Co., Ltd.) and having a thickness of 2 mm, the core being enclosed with the cover. The golf balls were heated at a temperature of 100° C. in an oven for 30 minutes. Subsequently, their covers were separated from cores following the aforementioned steps ① to ④ through the use of the apparatus of the first embodiment. As a result, time required to separate a cover from a core was approximately 8 seconds per golf ball.

Example 2

Golf balls identical to those used in Example 1 were heated at a temperature of 150° C. in an oven for 5 minutes. Subsequently, their covers were separated from cores following the aforementioned steps ① to ④ through the use of the apparatus identical to that used in Example 1. As a result, time required to separate a cover from a core was approximately 7 seconds per golf ball.

Example 3

Through the use of the apparatus for removing covers from golf balls according to the second embodiment, covers were removed from golf balls following the aforementioned steps (1) to (5). The geared rolls of the cover separation means used had a diameter of a deddendum circle, a diameter of an addendum circle, a circular pitch, an axial length, and a rotational speed identical to those of the geared rolls used in Examples 1 and 2. The golf balls used were also identical to those used in Examples 1 and 2.

In step (1), the golf balls were heated for approximately 25 seconds through the use of a die heated to a temperature of approximately 140° C. In step (2), the golf balls were hot-pressed at a load of 1.5 t for approximately 25 seconds through the use of upper and lower dies heated to a temperature of approximately 140° C. As a result, the annular projection 8 of a cover was formed for each of the golf balls. Steps (1) to (3) were performed substantially continuously with no idle time present therebetween. As a result, time required to separate a cover from a core through the use of the cover separation means, i.e. time elapsed from the placement of a golf ball on the geared rolls to the separation of a cover from a core, was approximately 4 seconds per golf ball.

Comparative Example 1

Golf balls were heated in an oven maintained at a temperature of 100° C. for 30 minutes. Subsequently, covers were manually removed through the use of pliers. Time required to separate a cover from a core was approximately 55 seconds per golf ball.

It was confirmed from Examples 1 to 3 and Comparative Example 1 that the apparatus for removing covers from golf balls according to the present invention enables a user to remove covers from golf balls quickly and efficiently.

Example 4

Through the use of the apparatus for removing covers from golf balls according to the third embodiment, covers were removed from golf balls in the same steps as in Example 3. The geared rolls of the cover separation means used had a diameter of a deddendum circle, a diameter of an addendum circle, a circular pitch, an axial length, and a rotational speed identical to those of the geared rolls used in Example 3. The golf balls used were also identical to those used in Example 3. Also, processing conditions in steps (1) to (3) are similar to those in Example 3.

The linear elements 64 of the cover-detaching means 60 were made of nylon and had a linear element diameter of 0.1 mm and a length such that the tip of the linear element 64 projects 3 mm beyond the tip of a tooth of the geared roll 14 in an assembled state. The rotational speed of the rotary brush 66 was rendered 5% faster than that of the geared roll 14.

100 golf balls were tested for the separation of a cover from a core. Since the cover-detaching means detached a cover, if any, from the geared roll, a removed cover was not bitten again between the geared rolls. Accordingly, covers were satisfactorily separated from cores with the all. 100 golf balls.

Example 5

Through the use of the apparatus for removing covers from golf balls according to the fourth embodiment, covers were removed from golf balls in the same steps as in Example 3. The geared rolls of the cover separation means used had a diameter of a deddendum circle, a diameter of an addendum circle, a circular pitch, an axial length, and a rotational speed identical to those of the geared rolls used in Example 3. The golf balls used were also identical to those used in Example 3. Also, processing conditions in steps (1) to (3) are similar to those in Example 3.

100 golf balls were tested for the separation of a cover from a core. Since the cover-detaching means detached a cover, if any, from the geared roll, a removed cover was not bitten again between the geared rolls. Accordingly, covers were satisfactorily separated from cores with the all 100 golf balls.

Comparative Example 2

Covers were removed from golf balls in a manner similar to that of Examples 4 and 5 except that the cover-detaching means were not provided. 100 golf balls were tested for the separation of a cover from a core. As a result, for 20 golf balls, a core and a cover were separated from each other without a removed cover being bitten again between the geared rolls. However, for 80 golf balls, a removed cover adhered to the geared roll and was thus bitten again between the geared rolls.

It was confirmed from Examples 4 and 5 and Comparative Example 2 that providing the apparatus of the present invention with the cover-detaching means prevents the occurrence of a mechanical problem which would otherwise be caused by a removed softened cover which remains adhering to the geared roll and is then bitten again in a hardened state between the geared rolls.

What is claimed is:

1. A method of separating a cover from a golf ball, comprising the steps of:

rotating a pair of geared rolls in an engaged manner, each geared roll comprising a cylindrical shaft on which teeth are axially formed and are circumferentially arranged at predetermined pitches;

placing the golf ball on an upstream side of rotation of the geared rolls in order to cause a portion of the cover of the golf ball to be bitten between the geared rolls; and advancing the cover bitten between the geared rolls by a rotational force of the geared rolls and thereby drawing the cover out to a downstream side of rotation of the geared rolls, thereby separating a core and the cover of the golf ball from each other.

2. A method of separating a cover from a golf ball according to claim 1, wherein prior to separating said cover from a golf ball, the golf ball is heated and said cover of the heated golf ball is partially deformed to form a projection, and subsequent to heating the projection is bitten between the geared rolls.

3. A method of separating a cover from a golf ball according to claim 2, wherein the heating of the cover and the formation of the projection are concurrently performed.

4. A method of separating a cover from a golf ball according to claim 1, wherein the cover is removed while the cover is heated.

5. A method of separating a cover from a golf ball according to claim 1, wherein prior to the removal of the cover, a coating layer is removed from the surface of the cover.

6. A method of recycling a golf ball, comprising the steps of:

rotating a pair of geared rolls in an engaged manner, each geared roll comprising a cylindrical shaft on which teeth are axially formed and are circumferentially arranged at predetermined pitches;

placing the golf ball on an upstream side of rotation of the geared rolls in order to cause a portion of the cover of the golf ball to be bitten between the geared rolls; and advancing the cover bitten between the geared rolls by a rotational force of the geared rolls and thereby drawing the cover out to a downstream side of rotation of the geared rolls, thereby separating a core and the cover of the golf ball from each other; and enclosing said core with a new cover.

7. A method of recycling a golf ball, comprising the steps of separating a core and a cover of a golf ball from each other by using an apparatus comprising, cover separation means which comprises a pair of geared rolls, which rotate in an engaged manner and each of which comprises a cylindrical shaft on which teeth are axially formed and are circumferentially arranged at predetermined pitches, wherein part of the cover of the golf ball, which is placed on an upstream side of rotation of said geared rolls, is bitten between said geared rolls, and the cover bitten between said geared rolls is advanced by a rotational force of said geared rolls to be drawn out to a downstream side of rotation of said geared rolls, to thereby separate the core and the cover of the golf ball from each other; and enclosing the core that was separated from the cover with a new cover.

8. A method of recycling a golf ball, comprising the steps of:

rotating a pair of geared rolls in an engaged manner, each geared roll comprising a cylindrical shaft on which teeth are axially formed and are circumferentially arranged at predetermined pitches;

placing the golf ball on an upstream side of rotation of the geared rolls in order to cause a portion of the cover of the golf ball to be bitten between the geared rolls; and advancing the cover bitten between the geared rolls by a rotational force of the geared rolls and thereby drawing the cover out to a downstream side of rotation of the geared rolls, thereby separating a core and the cover of the golf ball from each other; and enclosing a new core with a new cover made from said cover that was separated from the core.

9. A method of recycling a golf ball, comprising the steps of separating a core and a cover of a golf ball from each other by using an apparatus comprising cover separation means which comprises a pair of geared rolls, which rotate in an engaged manner and each of which comprises a cylindrical shaft on which teeth are axially formed and are circumferentially arranged at predetermined pitches, wherein part of the cover of the golf ball, which is placed on an upstream side of rotation of said geared rolls, is bitten between said geared rolls, and the cover bitten between said geared rolls is advanced by a rotational force of said geared rolls to be drawn out to a downstream side of rotation of said geared rolls, to thereby separate the core and the cover of the golf ball from each other, and enclosing a new core with a new cover made from material from said cover that was separated from the core.

* * * * *